United States Patent [19]

Feinbloom et al.

[11] 4,397,523

[45] Aug. 9, 1983

[54] UNIVERSAL CABLE SOCKET APPARATUS PARTICULARLY ADAPTED FOR USE WITH FIBER OPTIC CABLES

[75] Inventors: Richard E. Feinbloom, New York; Richard Lepczynski, Brooklyn; Wladyslaw Oleksy, New York, all of N.Y.

[73] Assignee: Designs for Vision, Inc., New York, N.Y.

[21] Appl. No.: 268,716

[22] Filed: Jun. 1, 1981

[51] Int. Cl.³ .............................................. G02B 7/26
[52] U.S. Cl. .................................. 350/96.20; 279/102
[58] Field of Search .............. 350/96.10, 96.20, 96.23; 339/254, 255 R; 362/32; 279/1 SG, 23 R, 66, 102; 285/177, 319; 403/220, 263

[56] References Cited

U.S. PATENT DOCUMENTS

| | | | |
|---|---|---|---|
| 3,734,594 | 5/1973 | Trambarulo | 350/96.21 |
| 3,959,612 | 5/1976 | Feinbloom | 200/11 R |
| 3,982,815 | 9/1976 | Nakayama | 350/96.22 |
| 3,999,841 | 12/1976 | Dakss et al. | 350/320 |
| 4,232,934 | 11/1980 | Feinbloom | 350/96.20 |
| 4,249,799 | 2/1981 | Iglesias | 350/257 |

Primary Examiner—John D. Lee
Assistant Examiner—Frank Gonzalez
Attorney, Agent, or Firm—Arthur L. Plevy

[57] ABSTRACT

There is disclosed a socket assembly for use with a fiber optic light source to enable accommodation of fiber optic cables of varying diameters. The assembly includes a bottom housing section having a central aperture with a plurality of transverse slots communicating with the aperture. Each slot contains a clamp member which includes a spring located in a hollow of the clamp near the bottom surface. The slot contains an extending post which coacts with the spring when the clamp is retained in the slot. A top housing section is rotatably and movably positioned about the bottom housing and has a central aperture coaxial with the aperture in the bottom housing. The aperture in the top housing is surrounded by a circular flange which coacts with a sloping back surface of each clamp member to push the clamp members into the aperture when the top housing is moved downwardly towards the bottom housing. The clamp members are biased by the spring to exert a force about the periphery of a cable inserted within the apertures.

10 Claims, 12 Drawing Figures

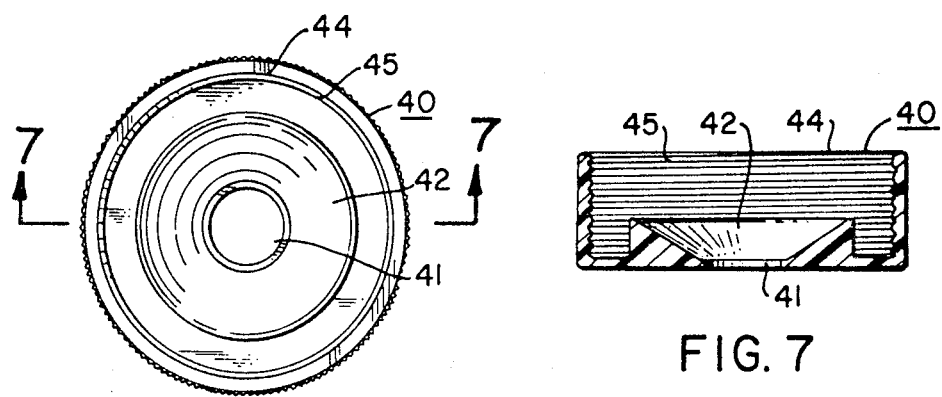
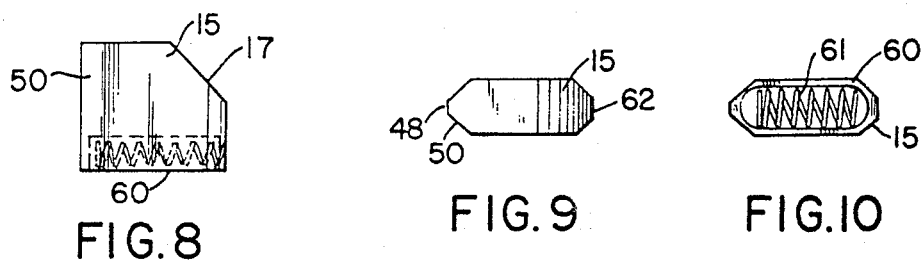
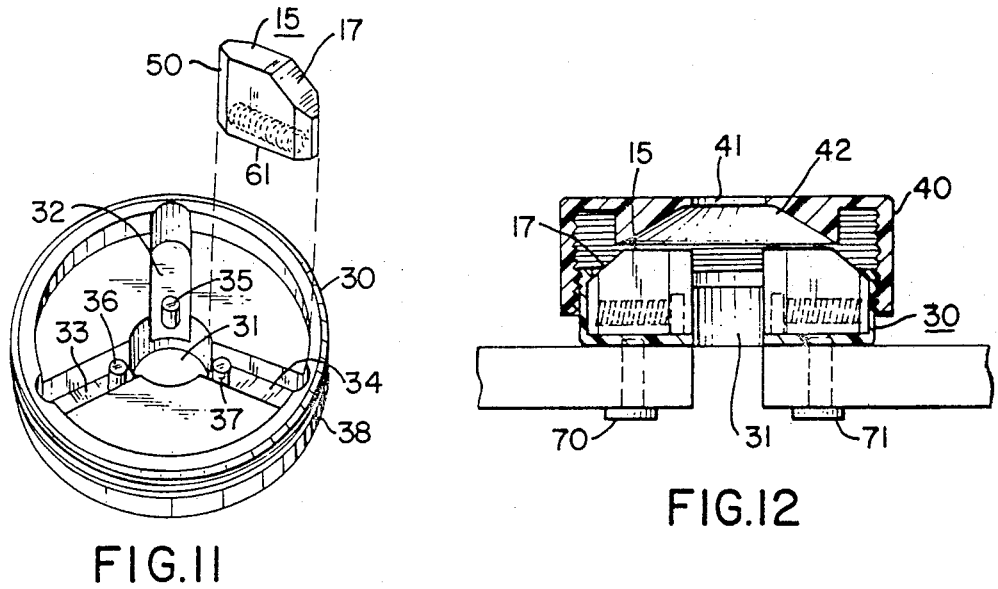

UNIVERSAL CABLE SOCKET APPARATUS PARTICULARLY ADAPTED FOR USE WITH FIBER OPTIC CABLES

BACKGROUND OF INVENTION

This invention relates to a connector assembly and more particularly to a universal connector assembly or socket adapted to accomodate fiber optic cables of varying diameter.

Presently there are many patents and apparatus which employ fiber optic cables to conduct light from a given source. As such, the prior art is cognizant of typical means for connecting or coupling fiber optic cables and there are many patents in the prior art which show various apparatus in the form of connectors or sockets for such cables.

A patent such as U.S. Pat. No. 3,734,594 entitled OPTICAL FIBER CONNECTOR issued on May 22, 1973 shows a connector which holds a cable between a pair of metallic pressure plates. Other patents as U.S. Pat. Nos. 3,982,815; 3,999,841 and 3,989,567 show various means of connecting fiber optic bundles and various connector means.

U.S. Pat. No. 4,232,934 issued on Nov. 11, 1980 to Richard E. Feinbloom entitled UNIVERSAL CONNECTOR ASSEMBLY PARTICULARLY ADAPTED FOR USE WITH FIBER OPTIC CABLES and assigned to Designs for Vision, Inc., the assignee herein. This Patent discloses a connector assembly which can accomodate fiber optic cables of varying diameters. The connector assembly in the Patent has a plurality of transverse slots which communicate with a central aperture in the connector. Each slot contains a clamp member which is biased by means of a spring when a cable or rod is inserted into the aperture. The clamp members are forced outwardly within the radial slot. The rod or cable is then grasped by the clamp members as the associated springs urge the members against the rod to secure the same in position. The above noted connector has been widely accepted and used. However, due to the operation the end of peripheral surface of the cable can be damaged as the cable may be continuously inserted and removed from the connector. The connector described in this Patent is used with a fiber optic cable.

The use of fiber optic cable is relatively widespread in the field of medicine. The fiber optic cable in conjunction with a light source is generally known as a cold light source. In the medical field, the physician or surgeon uses the fiber optic cable to direct light at an area under investigation.

Basically, a fiber optic light source comprises a fiber optic light bundle which is illuminated by a high intensity, high wattage lamp. The fiber optic bundle may be several feet long and is positioned in a housing with respect to the lamp so that the filament of the lamp transfers maximum light to the cable. The surgeon uses the fiber optic cable as a light source and can hence direct light in any desired position during an operation or otherwise. The fiber optic cable does not produce or conduct the heat from the light and hence the term "cold light source" has been employed.

Various manufacturers have and do make fiber optic cables of different diameters. The typical diameter of such cables can vary between 3/32" to ½" or more. The various diameters are afforded due to the fact that each manufacturer would like to sell its light source together with its particular cable. Essentially, then a physician or hospital would have to purchase a different light source for each type of fiber optic cable or instrument.

It is therefore an object of the present invention to provide a universal connector or socket apparatus which is capable of accomodating fiber optic cables of various diameters and which connector is easily adjustable to accomodate many diameters without defacing the associated cable.

BRIEF DESCRIPTION OF THE PREFERRED EMBODIMENT

An adjustable connector apparatus for accomodating various diameter fiber optic cable assemblies to be exposed to a source of light contained within a housing upon which said connector apparatus is mounted, comprising a first housing section having an aperture and having on a top surface a plurality of transverse slots each communicating with said aperture and each extending transverse thereto, said housing having a threaded outer peripheral portion, a plurality of clamp members, each having a sloping backwall and having an internal hollow contiguous with an open bottom end, each separate one positioned within an associated one of said slots with said back wall facing the outer periphery of said first housing section, means located in each slot and adapted to coact with a spring in said clamp to compress the same when said clamp is moved towards said aperture, a second housing section having an aperture coaxial with said aperture in said first housing and having a downwardly depending circular sloping flange positioned about said aperture, with the inner periphery of said housing threaded so that when emplaced upon said first housing said second housing can rotatably move towards or away from said slots, with said flange coacting with the backwall of each clamp member to push said members into said aperture for one direction of rotation and to allow said clamp members as biased by said springs to move out of said aperture for the opposite direction of rotation.

BRIEF DESCRIPTION OF THE FIGURES

FIG. 6 is a bottom plan view of the top housing section.

FIG. 7 is a cross-sectional view taken through line 7—7 of FIG. 6.

FIG. 8 is a side view of the clamp member.

FIG. 9 is a top view of the clamp member.

FIG. 10 is a bottom view of the clamp member.

FIG. 11 is a perspective assembly view of the bottom housing section with a clamp member.

FIG. 12 is a sectional view showing the top housing emplaced and positioned on the bottom housing.

DETAILED DESCRIPTION OF THE FIGURES

Figure 1:
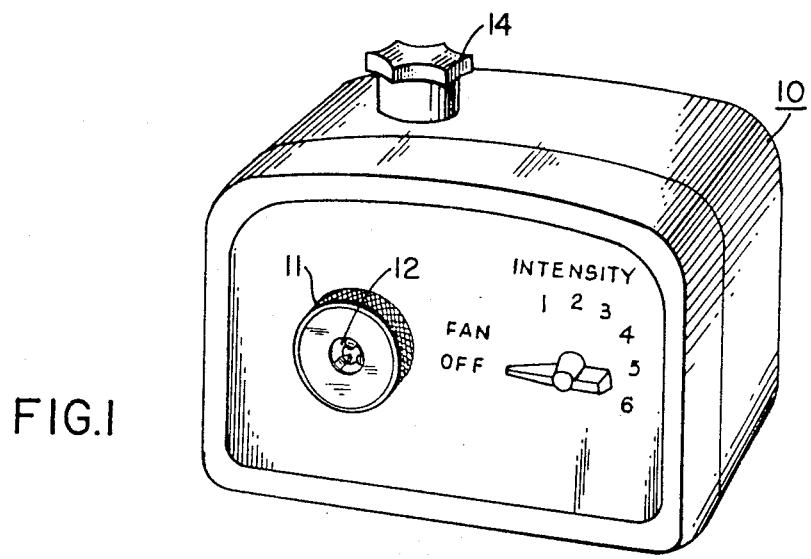
FIG. 1 is a perspective view of a light source housing.

Referring to FIG. 1, there is shown a perspective view of a fiber optic light source housing assembly.

The housing 10 of FIG. 1 includes a high intensity light source such as a halogen lamp assembly which may typically operate at 21 volts with 150 watts of power. The lamp assembly is carefully aligned with an aperture in the housing 10 so that light from the lamp filament is concentrated and aligned with the aperture.

Located over the aperture in the housing is a connector block or socket assembly 11. The socket assembly has an aperture 12 which is coaxial with the aperture in the housing 10. As will be explained, the connector block 11 has the ability of accomodating fiber optic cables of varying diameters according to this invention.

The light source 10 has a knob 14 which is used to rotate a new bulb into position if a bulb fails during an operation or during a medical procedure. A source such as 10 is manufactured by the Assignee herein, Designs for Vision, Inc. and marketed under the trademark THE QUADRILITE 4000. The particular details and construction and operation of such a fiber optic light source can be had by referring to U.S. Pat. No. 3,959,612 entitled ROTARY SWITCH ASSEMBLY PARTICULARLY ADAPTED FOR USE WITH FIBER OPTIC LIGHT SOURCES issued on May 25, 1976 to Richard E. Feinbloom and assigned to the Assignee herein. The patent shows a connector assembly for accommodating a particular diameter fiber optic cable.

Figure 2:
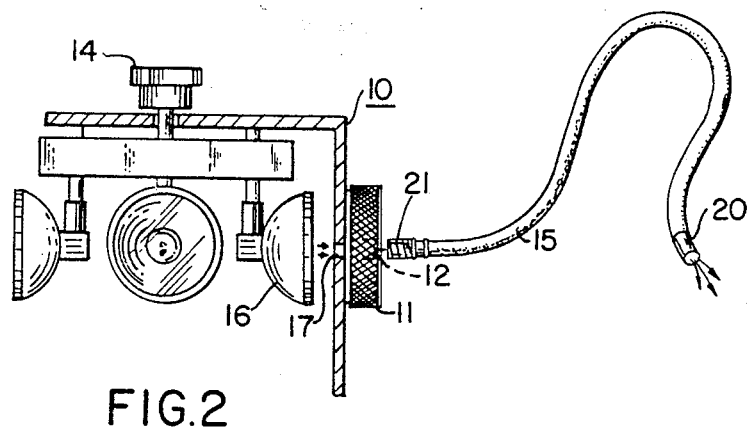
FIG. 2 is a partial cross-sectional view of a light source housing employing a connector assembly according to this invention.

Referring to FIG. 2, there is shown a cross-sectional view of the housing 10 in order to show the alignment of a fiber optic cable 15 within the aperture 12 of the connector assembly 11.

Essentially, a high intensity lamp 16 is positioned so that the filament of the lamp is aligned with respect to the aperture 17 in the housing to provide maximum light transfer. Positioned on the front surface of the housing is the connector block assembly 11 with its aperture 12 in alignment with the aperture 17 of the housing.

The fiber optic cable 15 is plugged into the aperture 12 of the connector assembly 11 and conducts the light about its output end 20 to enable the physician, as indicated, to direct light at a desired area.

As indicated, the diameter of the fiber optic cable 15 as well as the particular input connector shape 21 can vary substantially from manufacturer to manufacturer and typical variations range from about 2.5 mm to 12.5 mm.

The connector assembly 11, as will be explained, enables one to employ any different type cable 15 with the particular light source. This, thus enables a physician to use a plurality of various diameter cables with a single light source as 10 and be assured of efficient and reliable operation.

Figure 3:
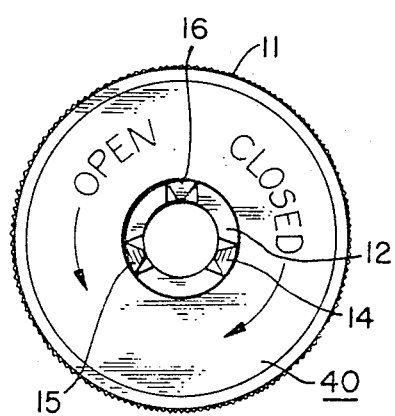
FIG. 3 is a top plan view of the connector or socket assembly.

Referring to FIG. 3, there is shown a connector or socket assembly 11. The assembly 11 is shown in a top view and is relatively circular in shape. The assembly 11 is fabricated from aluminium or some other strong material. The connector assembly 11 has an aperture 12 directed from the top surface to the bottom surface. The aperture 12 is of a larger diameter at the top surface and is coaxial with a smaller inner diameter aperture coaxial with a bottom assembly member forming the bottom section of the connector 11. The connector 11 contains three movable clamps as 14, 15 and 16. The clamps can move inwardly or outwardly in a radial manner as the top section of the connector is rotated with respect to the bottom section. Each clamp is positioned at angles of 120° apart and are constrained in movement by means of an associated slot located in the bottom section of the connector 11.

Figure 4:
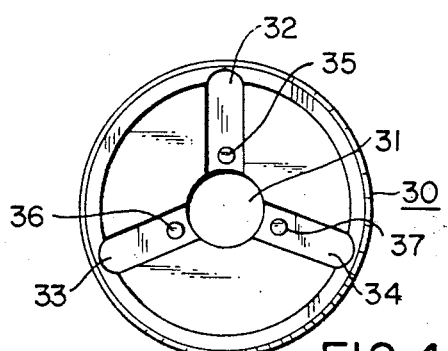
FIG. 4 is a top plan view of a bottom housing section of the connector assembly.

Referring to FIG. 4, there is shown a top view of the bottom section 30 of the connector 11. The bottom section 30 has a central aperture 31 which communicates and is coaxial with a larger aperture in the top section. Located in the bottom section are three transverse slots 32, 33 and 34. Each slot communicates with the aperture 31. Each slot has an extending circular post 35, 36 and 37. Each post is firmly secured within the slot to the bottom housing 30.

Figure 5:
FIG. 5 is a side view of the bottom housing section.

Referring to FIG. 5, there is shown a front view of the bottom section 30. The bottom section 30 has its top portion surrounded by a screw thread 38. As will be explained, the top section of the connector 11 has a corresponding thread which engages the thread 38 of the bottom section. As the top section is rotated in a clockwise direction, it moves downwardly with respect to the bottom section. If the top section is rotated in a counter clockwise direction, it moves upwardly with respect to the bottom section.

In this manner the clamp members 14, 15 and 16 move inwardly or outwardly as shown in FIG. 3 as to CLOSE or OPEN. FIG. 3 shows the top surface of the top section while FIG. 6 shows an inner view of the top section 40. The top section has a central aperture 41 which corresponds to aperture 12 and is of a larger diameter than aperture 31 of the bottom section. Surrounding the aperture 41 is a circular upwardly extending flange 42. The inner peripheral surface 44 of the top section 40 is threaded with a corresponding thread 45 which thread matches thread 38 of the bottom section 30.

FIG. 7 depicts a cross-sectional view through line 7—7 showing the format of the circular flange 42.

Referring to FIG. 8, there is shown a side view of a typical clamp member as clamp 15.

FIG. 9 depicts a top view while FIG. 10 depicts a bottom view of the clamp member.

As seen from FIG. 8 the clamp member has a sloping back section 17. The clamp has a front section having a central flat 48 formed between two sloping side walls 49 and 50. The clamp has a bottom cavity 60 into which is inserted a spring 61. In this manner, the clamp is emplaced within the associated slot.

As can be seen from FIG. 9, the back surface 62 of each clamp is rounded or configured so that it can be positioned within the back of the slot as slot 32 to enable the clamp member to sit within the slot with its back end positioned in the opening at the flange 35.

Referring to FIG. 11, there is shown a clamp member 15 about to be positioned within the slot 32 with the spring 61 shown dashed. As one can ascertain from FIG. 11, the clamp member 15 is positioned in the slot with the sloping back wall 17 facing the outer periphery of the housing 30. The post 35 is directed into the hollow of the clamp member 15 and coacts with the spring 61.

Referring to FIG. 12, there is shown the top housing section 40 emplaced upon the bottom housing section 30 with the inner peripheral screw thread of housing 40 coacting with the outer peripheral thread 38 of housing 30. Housing 30 has two apertures on the bottom surface so that it may be secured to the front surface of the light source by means of screws or fasteners 70 and 71. As can be seen from FIG. 12, the sloped circular flange of housing section 40 coacts with the sloping back wall 17 of each clamp member as the housing 40 is rotated clockwise or in the CLOSE position (FIG. 3), the housing 40 moves downwardly with respect to housing 30 or moves towards the slots. The flange due to its sloping surface pushes each clamp member into the aperture 31. Hence, if a rod or a fiber optic cable is inserted through apertures 41 and 31, one now can lock the rod in place by rotating the top housing 40 and hence causing the clamp members to be pushed in the aperture and grasp the cable or rod at the periphery at the three contact points. In this manner, the cable is coaxially and centrally positioned within the apertures thus enabled to receive a maximum amount of light from the light source.

As can be seen from the above description, the configuration shown is symmetrical. Each clamp member is fabricated from the same material and is relatively the same size and weight as is each spring. Since the cable is retained at three points, it is always correctly centered when inserted into the apertures of the connector with respect to the aperture in the light source housing. Due to the symmetrical flange on the top housing section each clamp member exerts relatively the same force on the cable. The connector is easy to fabricate and to operate and allows the user to retain various cables of different diameters. It is of course understood that one may vary the particular shapes of the members described without departing from the spirit and scope of this invention.

We claim:

1. An adjustable connector apparatus for accomodating various diameter fiber optic cable assemblies to be exposed to a source of light contained within a housing upon which said connector apparatus is mounted comprising:
   (a) a first housing section having an aperture and having on a top surface a plurality of transverse slots each communicating with said aperture and each extending transverse thereto, said housing having a threaded outer peripheral portion,
   (b) a plurality of clamp members, each having a sloping back wall and having an internal hollow contiguous with an open bottom end, each separate one positioned within an associated one of said slots with said back wall facing the outer periphery of said first housing section with a spring in each hollow,
   (c) means located in each slot and adapted to coact with each spring in said slot to compress the same when the associated clamp member is moved towards said aperture,
   (d) a second housing section having an aperture coaxial with said aperture in said first housing and having a downwardly depending circular sloping flange positioned about said aperture, with the inner periphery of said housing threaded so that when emplaced upon said first housing said second housing can rotatably move towards or away from said slots, with said flange coacting with the back wall of each clamp member to push said members into said aperture for one direction of rotation and to allow said clamp members as biased by said springs to move out of said aperture for the oppposite direction of rotation.

2. The adjustable connector member according to claim 1 with said first housing having at least three transverse slots located about and in communication with said aperture in said first housing.

3. The connector member according to claim 2 wherein said slots are located at 120 degree intervals about said aperture.

4. The connector member according to claim 1 wherein said aperture in said first housing is of a smaller diameter and coaxial with said aperture in said second housing.

5. The connector member according to claim 1 wherein said means positioned in said slots is an upstanding post adapted to be positioned within said internal hollow of said clamp member to coact with said spring.

6. The connector apparatus according to claim 1, wherein said first and second housing sections are circular housings.

7. The connector apparatus according to claim 1, wherein each of said clamp members has a front surface including a central flat with sloping side walls directed towards said back wall.

8. The connector apparatus according to claim 1 wherein said one direction of rotation is clockwise and said opposite direction is counter-clockwise.

9. The connector apparatus according to claim 1 further including means located on the bottom surface of said first housing section for coupling said connector apparatus to a surface of said housing containing said source of light.

10. The connector apparatus according to claim 1 wherein said clamp member extends above said slots when positioned therein.

* * * * *